June 24, 1930.  A. E. RACKOW  1,767,396
TRACTOR CLUTCH THROW-OUT MEANS
Filed Oct. 22, 1928  2 Sheets-Sheet 1
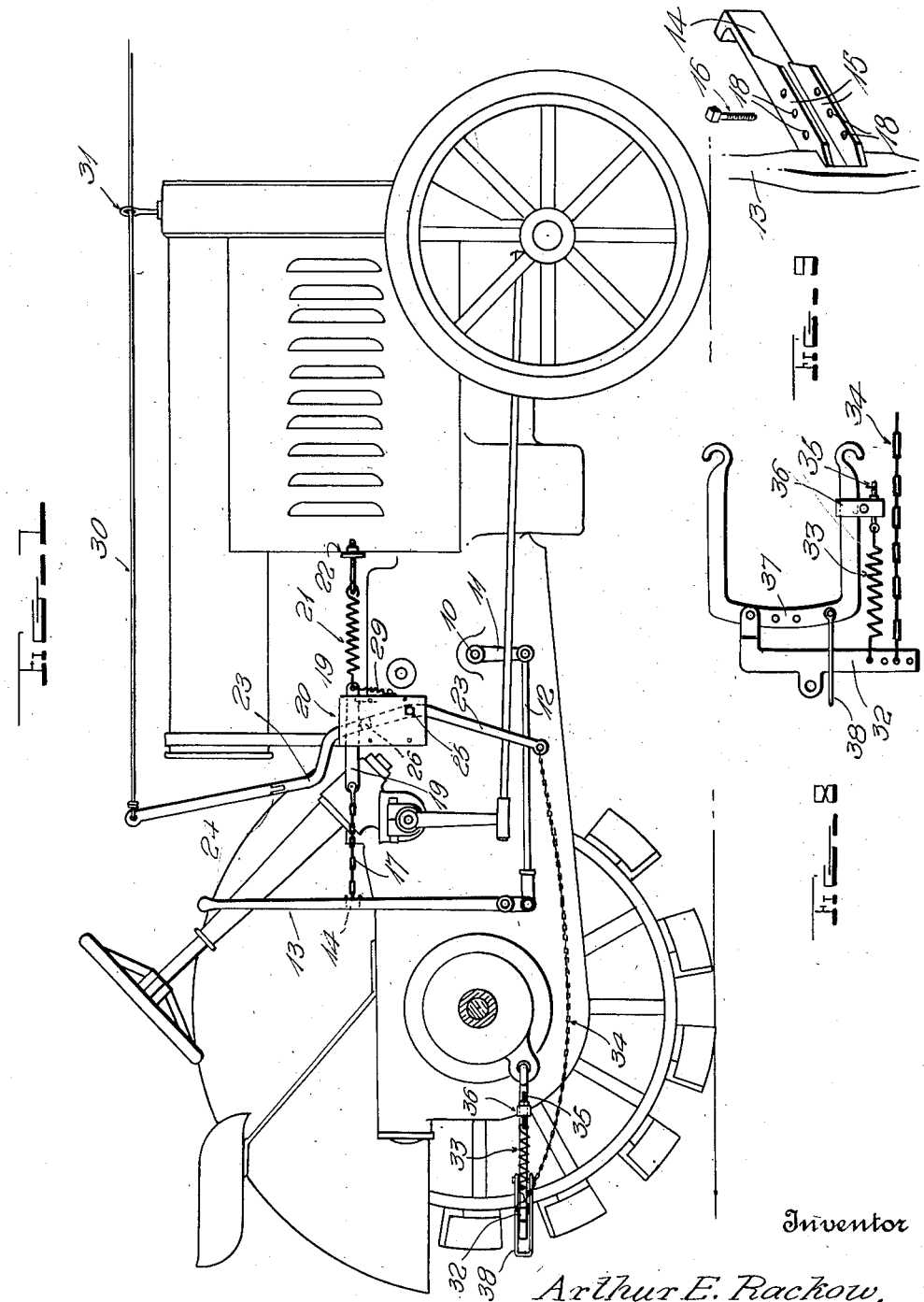
Inventor
Arthur E. Rackow,
By H. B. Willson & Co.
Attorneys

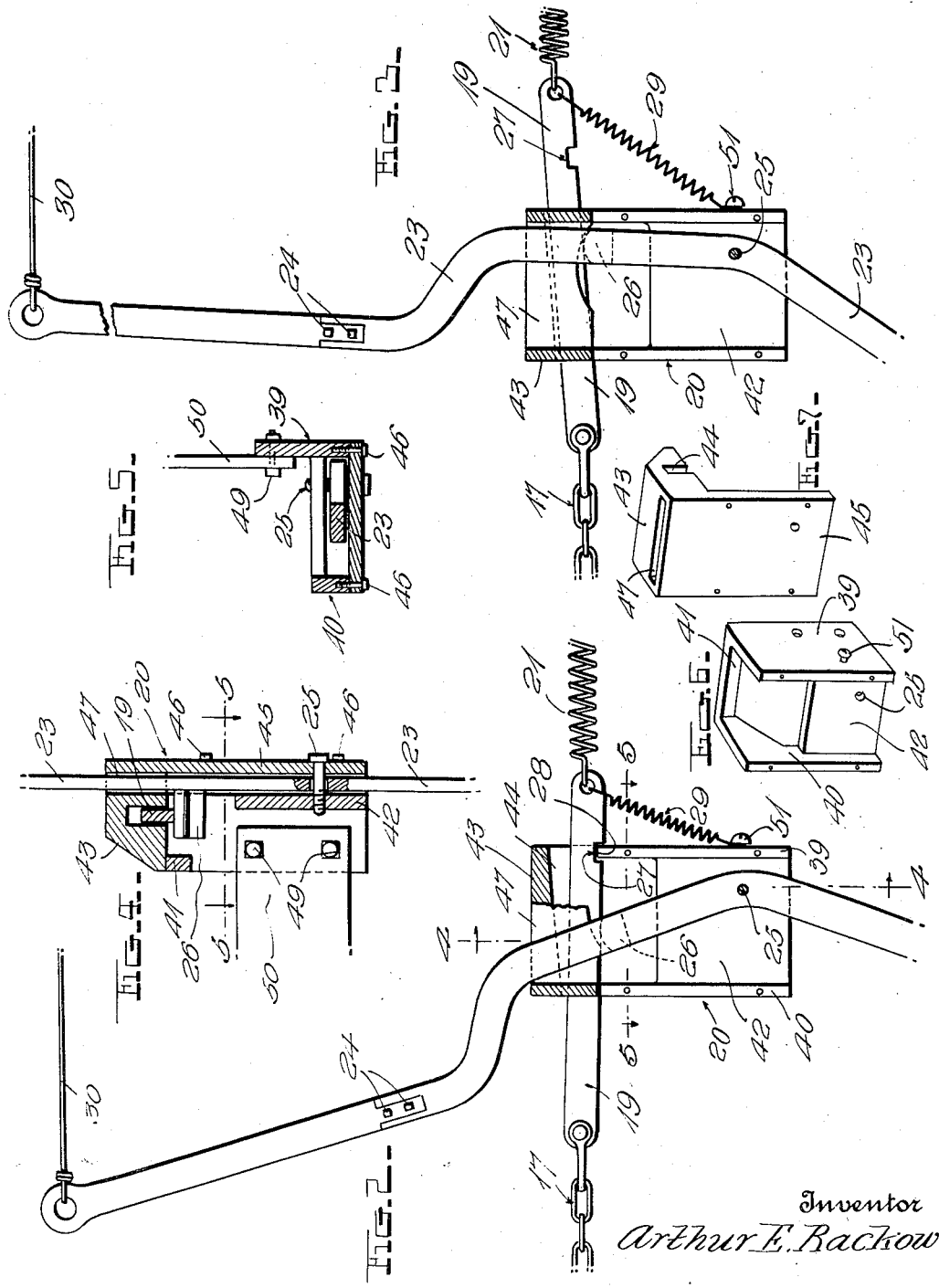

Patented June 24, 1930

1,767,396

UNITED STATES PATENT OFFICE

ARTHUR E. RACKOW, OF CAMPBELLSPORT, WISCONSIN

TRACTOR CLUTCH-THROW-OUT MEANS

Application filed October 22, 1928. Serial No. 314,224.

The invention relates to automatic throw-out means for tractor clutches, and the present disclosure involves means whereby the clutch may be controlled from a distant point when the tractor is being used as a stationary engine, and means whereby excessive rearward pull on the tractor hitch will also effect throwing out of the clutch when the tractor is being used for plowing or other work involving use of said hitch.

It is the principal object of the invention to provide rather simple and inexpensive, yet efficient means for throwing the clutch out by means of a spring-operated actuator, when this actuator is released from a normally held position, said actuator and a clutch throw-out member being connected with each other in such manner however, as to permit movement of said clutch throw-out member independently of said actuator. Thus, with the actuator set for operation when tripped, the clutch may be controlled in the usual way for starting and stopping the machine, shifting gears, etc.
With the foregoing in view, the invention resides in the novel subject matter hereinafter described and claimed, description being accomplished by reference to the accompanying drawings.
Fig. 1 is a side elevation of a tractor partly in section, showing the application of the invention thereto.

Fig. 2 is an enlarged elevation partly in section showing the normal relation of parts.

Fig. 3 is a view similar to Fig. 2 but illustrating the manner in which the actuator is released for movement under the influence of its operating spring.
Fig. 4 is a transverse sectional view on line 4—4 of Fig. 2.

Fig. 5 is a horizontal sectional view on lines 5—5 of Figs. 2 and 4.

Figs. 6 and 7 are perspective views of the two sections of the carrying body for the actuator and its release lever.

Fig. 8 is a top plan view of the rearwardly shiftable hitch.

Fig. 9 is a sectional perspective view of a portion of the combined hand and foot lever which is substituted for the usual clutch pedal.

The form of construction herein disclosed will be rather specifically described, with the understanding that within the scope of the invention as claimed, variations may be made.

A well known form of tractor is illustrated having a clutch throw-out shaft 10 provided with a downwardly projecting arm 11 which is usually connected by a link 12 with a clutch throw-out, foot-operated pedal. In the present showing however, a combined hand and foot lever 13 has been substituted for the clutch pedal, the upper end of this lever being accessible to the driver's right hand, while a rigid lateral pedal portion 14 on said lever is accessible to one of his feet. In the present showing, this pedal portion 14 is provided with forwardly projecting flanges 15 through which a bolt 16 passes to fasten the rear end of a chain 17 to the lever 13, and said flanges may be formed with a plurality of openings 18 to permit positioning of the chain at the most advantageous location. The front end of this chain is connected with a horizontally elongated actuator 19 which is slidable in a horizontal guideway in a body 20, this body being stationarily mounted upon the tractor in any desired manner. Connected with the front end of the actuator 19, is a heavy coiled spring 21 whose front end is adjustably anchored at 22 upon an appropriate part of the tractor. When lever 13 is pulled rearwardly to the maximum, spring 21 is tensioned and latch means hereinafter described then function to hold the actuator 19 in the position to which it has been moved, permitting clutch manipulating movements of the lever 13 without moving the actuator, due to the fact that chain 17 constitutes only a one-way connection between actuator 19 and lever 13 and merely idles when said lever is moved by hand or foot.

A substantially vertical lever 23 preferably formed of upper and lower sections bolted together at 24, is fulcrumed at 25 upon the body 20, said lever being provided with a lateral cam 26 which underlies the actuator 19 as seen in Fig. 2 to upwardly thrust said actuator upon proper movement of lever 23, thereby disengaging a shoulder 27 on the part 19 from a co-operating shoulder 28 on the body 20. These shoulders constitute the latch means for the actuator 19, and interengagement of said shoulders is effected upon rearward pull of said actuator, by means of a coiled spring 29 connecting the front end of said actuator with the body 20. As soon as actuator 19 is upwardly forced by cam 26 to release shoulder 27 from shoulder 28, spring 21 forwardly shifts said actuator as seen in Fig. 3, thereby pulling upon the chain 17 and so operating the lever 13 as to throw the clutch out. Lever 23 extends both upwardly and downwardly from its fulcrum 25 and I have shown a rope 30 connected to its upper end and passing through a guide 31 which is preferably mounted on the tractor radiator. A forward pull on this rope will move the lever 23 to effect throwing out of the cluth, when the tractor is being used as a stationary engine. The lower end of lever 23 is operatively connected with a lever 32 forming part of the tractor hitch, so that upon excessive pull when the tractor is being used for plowing or pulling some other machine, lever 23 will be operated to effect throwing out of the clutch. A heavy coil spring 33 has been shown connected with the lever 32 for normally holding it against rearward movement and a chain 34 has been illustrated, connecting said lever with the lower end of the lever 23. Under normal circumstances, this chain is slack, but when the plows strike a rock or other obstruction or anything else causes an excessive pull upon the lever 32, spring 33 permits rearward yielding of this lever and consequently the chain 34 is pulled, thereby operating the lever 23 to effect disengagement of the clutch. Now, if the obstruction is not such as to cause injury to any parts if the tractor is driven further ahead, lever 13 may be pulled back by hand against the tension of the spring 21 thereby again engaging the clutch and causing the tractor to continue in its advance. This is of particular advantage when plowing as it overcomes the necessity of adjusting the plows only for shallow work.

Preferably, the front end of the spring 33 is connected by an adjustable anchor such as an eye-bolt 35 with a clamp 36 secured to the conventional portion 37 of the tractor hitch, and to limit the swing of the lever 32 against the tension of said spring, an appropriate stop yoke 38 has been shown secured to said hitch portion 37.

The body 20 is of novel construction shown more particularly in Figs. 2 to 7 inclusive. 39 and 40 denote two vertically disposed parallel plates in planes transverse to the tractor, the upper, inner corners of of these plates being preferably connected with each other by an integral bar 41. The lower portion of plate 40 is preferably decreased in width and said portion is connected to the lower portion of the plate 39 by a vertical web 42 which is inwardly spaced from the outer vertical edges of both plates 39—40. The lever 23 is disposed against the outer side of this web 42 as shown, and the actuator 19 rests upon the upper edges of the plates 39—40, the upper edge of plate 39 constituting the shoulder 28 for co-action with the shoulder or notch 27 of said actuator. For guiding this actuator, a head-block 43 rests upon the upper edges of the plates 39—40 and the bar 41 and is provided in its lower side with a longitudinal groove 44. Integral with and projecting downwardly from the head-block 43, is a cover-plate 45 which is secured by cap-screws or the like 46 to the outer vertical edges of the plates 39—40, and the fulcrum 25 for the lever 23 passes through this cover-plate and through the web 42 so that it is held against possible canting and said lever may swing freely between said web and cover plate. The head-block 43 is provided with an appropriate slot 47 through which this lever passes.

Plate 39 is provided with openings 48 to receive bolts 49 for securing the entire body 20 to a portion of the tractor or to a bracket, a portion of which is indicated at 50 in Figs. 4 and 5. The screw 51 shown at the outer side of this plate 39, is merely the anchoring means for the lower end of the spring 29 above described.

The invention has been installed on a number of tractors and has proven highly successful, regardless of its rather simple and inexpensive construction. While I believe the best results are obtainable from the details disclosed, it will be understood that within the scope of the invention as claimed, numerous variations may be made.

I claim:—

1. In a clutch throw-out means, the combination of a clutch throw-out lever, an actuator for moving said lever, said actuator having an actuating spring, latch means for normally holding said actuator against movement under the influence of said spring, one-way connecting means between said actuator and said lever for permitting clutch throw-out movement of said lever without moving said actuator and for moving said lever in clutch throw-out direction upon operation of said actuator, and means for releasing said latch means to permit movement of said actuator under the influence of the aforesaid spring.

2. In a clutch throw-out means, a forwardly movable clutch throw-out lever, an actuator for said lever disposed in advance thereof, means mounting said actuator for forward and rearward movement and for slight shifting transversely of its forward and rearward line of movement, a spring connected with said actuator for forwardly moving it, a flexible connection between said actuator and said lever for permitting movement of the latter independently of the actuator and for operating said lever when said actuator is forwardly moved by said spring, co-operable shoulders on said actuator and said mounting means for holding the actuator against movement under the influence of the spring, said shoulders being separable upon said transverse shifting of said actuator, and a lever having a portion for so shifting said actuator to separate said shoulders.

3. In a clutch throw-out means, a forwardly movable clutch throw-out lever, an actuator for said lever disposed in advance thereof, means mounting said actuator for forward and rearward movement and for slight shifting transversely of its forward and rearward line of movement, a spring connected with said actuator for forwardly moving it, a flexible connection between said actuator and said lever for permitting movement of the latter independently of the actuator and for operating said lever when said actuator is forwardly moved by said spring, co-operable shoulders on said actuator and said mounting means for holding the actuator against movement under the influence of the spring, said shoulders being separable upon said transverse shifting of said actuator, and a lever having a portion for so shifting said actuator to separate said shoulders, said lever being vertically disposed and extending both upwardly and downwardly from said actuator, permitting actuation of said lever by either of two forces acting at its ends in opposite directions.

4. In a clutch throw-out means, a horizontally elongated block having a groove throughout the length of its lower side, two vertical plates upon whose upper ends said block rests, said upper ends of said vertical plates spanning said groove, a vertical web extending between and joined to said vertical plates in downwardly spaced relation with said block, an actuator slidably engaged with said groove and having a shoulder for engagement with the upper end of one of said vertical plates, and a lever fulcrumed to said web and disposed at the outer side thereof, said lever having a cam extending between the upper edge of said web and said block and passing under said actuator to disengage said shoulder of the latter from said one vertical plate upon swinging of said lever.

5. In a clutch throw-out means, a horizontally elongated block having a groove throughout the length of its lower side, two vertical plates upon whose upper ends said block rests, said upper ends of said vertical plates spanning said groove, a vertical web extending between and joined to said vertical plates in downwardly spaced relation with said block, an actuator slidably engaged with the upper end of one of said vertical plates, a lever fulcrumed to said web and disposed at the outer side thereof, said lever having a cam extending between the upper edge of said web and said block and passing under said actuator to disengage said shoulder of the latter from said one vertical plate upon swinging of said lever, a vertical cover plate parallel with said web and disposed at the outer side of said lever, said cover plate being joined to said block, the first named vertical plates having edges projecting laterally beyond said web, and means securing said cover plate to said edges, said block having a slot through which said lever passes.

6. In combination with a tractor having a clutch throw-out lever; an actuator for moving said lever, a spring for operating said actuator, latch means for normally holding said actuator, one-way connecting means between said lever and said actuator permitting clutch throw-out movement of said lever without moving said actuator, a hitch for the tractor rearwardly shiftable under excessive pull, and means connected with said hitch for releasing said latch means upon rearward shifting of said hitch.

In testimony whereof I have hereunto affixed my signature.

ARTHUR E. RACKOW.